US 6,206,219 B1

(12) United States Patent
Brüggenolte

(10) Patent No.: US 6,206,219 B1
(45) Date of Patent: Mar. 27, 2001

(54) APPARATUS FOR MONITORING THE CLOSED POSITION OF A LOCKING GAS CAP

(75) Inventor: Josef Brüggenolte, Bad Westernkotten (DE)

(73) Assignee: Adwest Kohler GmbH, Lippstadt (DE)

(*) Notice: Subject to any disclaimer, the term of this patent is extended or adjusted under 35 U.S.C. 154(b) by 0 days.

(21) Appl. No.: 09/445,365

(22) PCT Filed: Dec. 14, 1998

(86) PCT No.: PCT/EP98/08191

§ 371 Date: Dec. 10, 1999

§ 102(e) Date: Dec. 10, 1999

(87) PCT Pub. No.: WO00/01549

PCT Pub. Date: Jan. 13, 2000

(30) Foreign Application Priority Data

Jul. 1, 1998 (DE) .......................................... 298 11 706 U

(51) Int. Cl.[7] .................................................. B65D 41/04
(52) U.S. Cl. ............................................. 220/230; 220/304
(58) Field of Search .................................. 220/230, 288, 220/304, DIG. 33, 86.2

(56) References Cited

U.S. PATENT DOCUMENTS

| | | | |
|---|---|---|---|
| 3,986,634 | * 10/1976 | Smith et al. | 220/288 |
| 4,065,026 | * 12/1977 | Williams et al. | 220/304 |
| 4,223,799 | * 9/1980 | Eyster et al. | 220/230 |
| 4,957,266 | * 9/1990 | Ellis | 248/683 |
| 5,110,003 | * 5/1992 | MacWilliams | 220/304 |
| 5,975,328 | * 11/1999 | Hagano et al. | 220/288 |

FOREIGN PATENT DOCUMENTS

| | | |
|---|---|---|
| 4404014 | 8/1995 | (DE) . |
| 19501797 | 3/1997 | (DE) . |
| 19610471 | 10/1997 | (DE) . |
| 2168961 | 7/1986 | (GB) . |

* cited by examiner

*Primary Examiner*—Stephen Castellano
(74) *Attorney, Agent, or Firm*—Richard M. Goldberg

(57) ABSTRACT

An apparatus for monitoring the closed position of a locking gas cap (10) with a magnet (32) disposed at or in the locking gas cap and a solenoid (42) disposed at the tank connection pipe (12), the locking gas cap (10) having a torque limiter (36), and the magnet (32) being coupled with the torque limiter in such a manner, that it reaches a position, in which the solenoid (42) is triggered, only when the limiting torque is reached.

9 Claims, 1 Drawing Sheet

APPARATUS FOR MONITORING THE CLOSED POSITION OF A LOCKING GAS CAP

BACKGROUND OF THE INVENTION

The invention relates to an apparatus for monitoring the closed position of a locking gas cap, with a magnet disposed at or in the locking gas cap and a magnetic switch disposed at the tank connection pipe.

An apparatus of this type is described in the DE 44 04 014 A1 and serves to monitor the closed position of the locking gas cap of a motor vehicle so that, when the locking gas cap is not closed or closed incompletely, a warning signal appears on the dashboard of the vehicle.

In the case of the known apparatus, the locking gas cap has a bayonet catch and the magnet is disposed in such a manner, that it is in the vicinity of a reed switch, when the bayonet catch is locked. Depending on the construction, the reed switch is thus either open or closed when the locking gas cap reaches the locked position. Preferably, the reed switch is constructed so that it is closed in the locked position and that an associated evaluating circuit causes a warning signal to be displayed when the circuit of the reed switch is interrupted.

Since the magnetic field of the magnets cannot be localized to a narrow limited space, the position of the locking gas cap can be determined only relatively inaccurately according to this principle. For many tank caps, the locking gas cap is constructed as a screw-in plug. However, even in the case of bayonet-like tank caps, screw pitch surfaces are usually provided, which ensure that the plug, in the closed position, is pressed firmly against an associated seal. The possibility therefore exists that the locking gas cap is not turned completely into the end position, in which the tank opening is sealed reliably and in which a subsequent loosening of the locking gas cap due to vibrations is prevented because of the frictional engagement. However, because of the aforementioned inaccuracy in determining the position, the reed switch would also respond in such a case, so that the correct closing of the locking gas cap cannot be indicated reliably.

SUMMARY OF THE INVENTION

It is an object of the invention to make it possible to monitor the closed position of the locking gas cap with greater reliability.

Pursuant to the invention, this objective is accomplished owing to the fact that the locking gas cap has a torque limiter and the magnet is coupled with the torque limiter in such a manner, that it reaches a position, in which the magnetic switch is triggered, only when the limiting torque is attained.

By these means, it is ensured that the magnetic switch responds only when, while screwing in the locking gas cap, the limiting torque is actually reached and it is thus ensured that the locking gas cap is effectively closed tightly and completely.

A locking gas cap with a screw-in plug and a torque limiter is described already in DE 196 10 471 C2. This locking gas cap has a cap, which is rotatably disposed on the screw-in plug and is provided with a handle. The torque, which is exerted by the user on the cap, is transferred by the torque limiter to the screw-in plug. As soon as the limiting torque is exceeded when the closed position is reached, the cap rotates relative to the screw-in plug. In accordance with an advantageous development of the present invention, this relative movement is used for the purpose of transferring the magnet into the triggering position. Preferably, the magnet is held axially movable in the locking gas cap and, at the cap or at the plug of the locking gas cap, inclined surfaces are provided, which convert the rotation of the cap relative to the plug into an axial motion of the magnet. The magnet is pre-stressed elastically in the position at rest and is converted into the release position only when the limiting torque is reached by the inclined surfaces. At the same time, the inclined surfaces and the associated mating surfaces can be constructed in such a manner, that they can slide off one another when the cap is rotated further after it has reached the limiting torque. In this case, it is possible that the magnet springs back once again after it has exceeded the limiting torque and is removed from the release position. Preferably, this spring-back motion is, however, limited so that the magnetic switch, because of the magnetic remanence of the reed contacts, nevertheless remains closed. Only when the locking gas cap is loosened once again or removed completely, does the distance between the magnets and the magnetic switch become so large that the switch opens up. In this case, therefore, the magnetic switch exhibits some hysteresis behavior. It closes only when the limiting torque is reached or exceeded at least once, but then remains closed when the magnet once again is removed further from the magnetic switch.

Alternatively, an embodiment is also conceivable, for which the magnet, in the release position, is relatively close to a magnetizable body, so that, upon reaching the release position, it is held magnetically in the release position and springs back once again into the position at rest only when it is screwed out of the locking gas cap.

BRIEF DESCRIPTION OF THE DRAWINGS

In the following, examples of the invention are described in greater detail by means of the drawings, in which.

DETAILED DESCRIPTION

Figure 1:
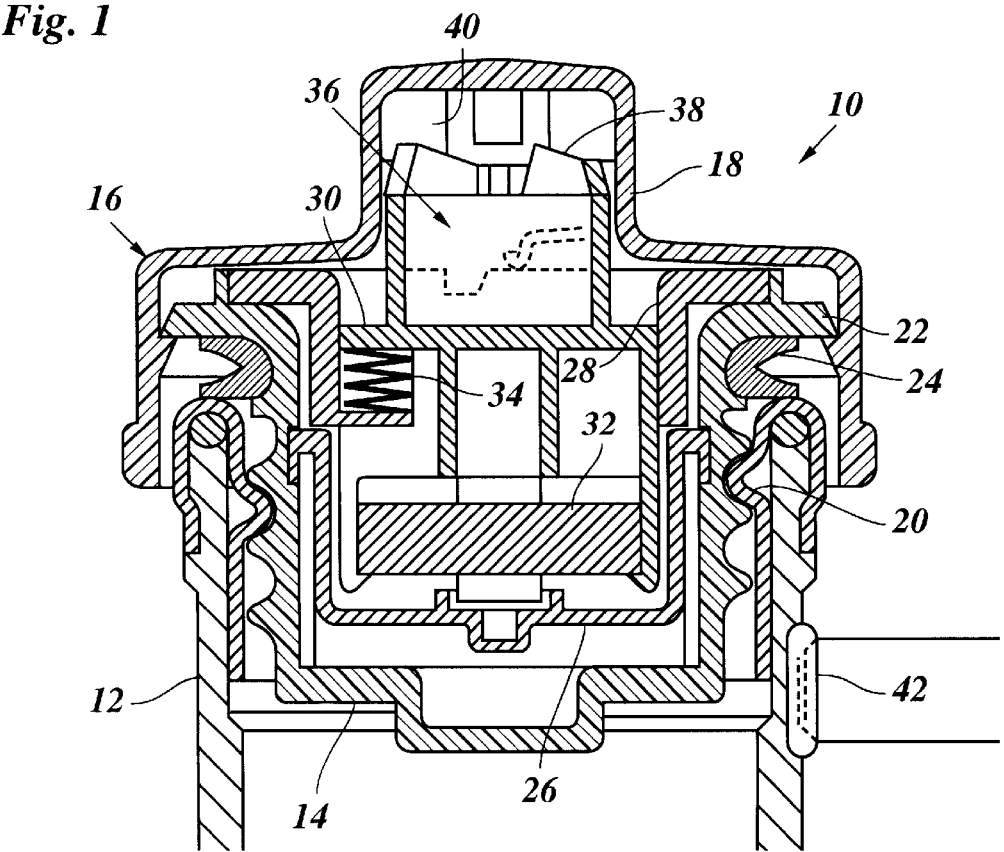
FIG. 1 shows a section through a locking gas cap when the closed position in a tank connection pipe is reached and FIG. 2 shows a section through the locking gas cap in a position after the limiting torque of a torque limiter is exceeded.

In FIG. 1, a locking gas cap 10 is screwed onto a connection pipe 12 of a fuel tank of a vehicle. The locking gas cap has a screw-in plug 14 and a cap 16, which is connected rotatably with the screw-in plug and forms a handle 18. In the opening of the tank connection pipe 12, a threaded insert 20 is fastened, which has engaged the external thread of the screw-in plug 14. FIG. 1 shows the locking gas cap in the closed position, in which a flange 22 of the screw-in plug, over a seal 24, is in sealing contact with the edge of the threaded insert 20.

In the interior of the screw-in plug 14, a pot-shaped inner part 26 and, further to the outside, that is, further towards the top in FIG. 1, a guiding bush 28 is disposed, in which a magnet carrier 30 is guided axially movably. A magnet 32 (permanent magnet) is held with holding claws at the magnet carrier 30 and lies within the pot-shaped inner part 26. The guiding bush 28 at the same time forms an abutment for the springs 34, which place the magnet carrier 30 and the magnet 32 elastically under tension in an upwards direction in FIG. 1 in a position at rest.

A known torque limiter 36 is effectively disposed between the cap 16 and the screw-in plug 14. When the locking gas cap is screwed onto the tank connection pipe, the rotational movement of the cap 16 is transferred by this torque limiter 36 to the screw-in plug 14 until a specified limiting torque is attained. This limiting torque is selected so that the screw-in plug 14 is then screwed firmly into the threaded insert 20 and closes off the tank connection pipe tightly. The torque limiter 36 is indicated in FIG. 1 merely by broken lines and is formed by springs, which are held at the cap 16 and engage a ring of notches surrounding the guiding bush 28 (see DE 196 10 471 C2). In the state shown in FIG. 1, the limiting torque has just been exceeded, so that the spring has been displaced from the associated notch.

At its upper end protruding into the handle 18, the magnet carrier 30 has a ring of cams 38, which are skewed in the peripheral direction and interact with the releasing devices 40, formed in the handle 18. When the limiting torque of the torque limiter is exceeded, the cap 16 turns relative to the screw-in plug 14 and, with that, also relative to the magnet carrier 30. The releasing devices 40 therefore slide on the skewed cams 38 and force the magnet carrier 30 downward, against the force of the springs 34, into the release position shown in FIG. 1. In this position, the magnet 32 brings about the closing of the reed contacts of a magnetic switch 42, which is disposed on the outside at the tank connection pipe 12. In this manner, a signal is generated, which indicates the complete closing of the locking gas cap.

Figure 2:
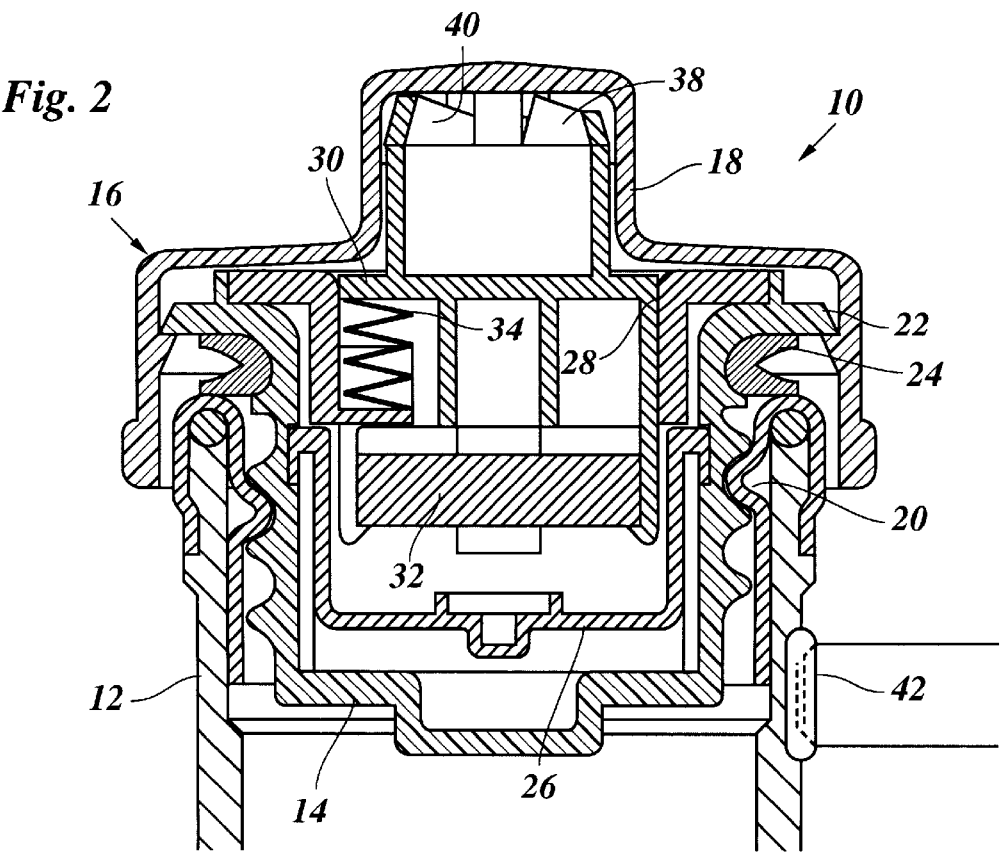

If the cap 16 is turned further, the releasing devices 40 slide from the cam 38, and the magnet carrier 30, under the action of the spring 34, rebounds up once again, so that it assumes the position at rest, shown in FIG. 2. In this position, the magnet is further removed from the solenoid 42. If the magnetic switch 42 previously was closed, it remains closed because of the magnetic remanence in the closed state.

When the locking gas cap 10 is screwed out of the tank connection pipe 12, the distance between the magnet 32 and the magnetic switch 42 becomes larger, so that the magnetic switch opens up. Since the torque limiter 36 can act only in one direction of rotation, a torque, unlimited in principle, can be transferred to the screw-in plug 14 as it is being screwed out.

Subsequently, if the locking gas cap is screwed back once again onto the tank connection pipe and has reached once again the position shown in FIG. 2, the magnetic switch 42 remains open, since the force of the magnet 32 alone is insufficient for bringing the reed contacts into the closed position. Only when the limiting torque is exceeded once again and, at the same time, the magnet carrier 30 is moved once more into the release position shown in FIG. 1, does the magnetic force become so large that the magnetic switch 42 is closed once again and then remains closed.

In a modified embodiment, it is also possible to form the torque limiter directly by the cams 38 and the releasing devices 40.

What is claimed is:

1. An apparatus for monitoring the closed position of a locking gas cap relative to a tank connection pipe, said apparatus comprising:

a magnet mounted to the locking gas caps a magnetic switch disposed at the tank connection pipe, and a torque limiter mounted to the locking gas cap and coupled with the magnet in such a manner that the magnet reaches a position in which the magnetic switch is triggered only when a limiting torque of the torque limiter is reached when the locking gas cap closes the tank connection pipe.

2. The apparatus of claim 1, wherein:

the locking gas cap has a plug which closes off the tank connection pipe, and a rotatable cap, which is coupled by the torque limiter with the plug, and when the limiting torque is exceeded, can be rotated relative to the plug, and the magnet can be moved into a release position by rotation of the cap relative to the plug.

3. The apparatus of claim 2, wherein the plug is a screw-in plug.

4. The apparatus of claim 2, wherein the magnet is held axially movable in the plug.

5. The apparatus of claim 4, further comprising:

a magnet carrier mounted to the locking gas cap for holding the magnet, an arrangement for placing the magnet under tension elastically in a position at rest, which is opposite the release position, releasing devices on the rotatable cap, and cams formed on the magnet carrier for, in conjunction with the releasing devices, pressing back the magnet into the release position.

6. The apparatus of claim 5, wherein the cams and the releasing devices, upon reaching or exceeding the limiting torque, permit the magnet carrier to spring back into the position at rest, and in that the position of the magnet in the position of rest and its strength are matched to the position of the magnetic switch in such a manner, that the magnetic switch, having been closed once, remains in the closed state even if the magnet is in the position at rest.

7. The apparatus of claim 3, wherein the magnet is held axially movable in the plug.

8. The apparatus of claim 4, further comprising:

a magnet carrier mounted to the locking gas cap for holding the magnet, an arrangement for placing the magnet under tension elastically in a position at rest, which is opposite the release position, releasing devices on the rotatable cap, and cams formed on the magnet carrier for, in conjunction with the releasing devices, pressing back the magnet into the release position.

9. The apparatus of claim 5, wherein the cams and the releasing devices, upon reaching or exceeding the limiting torque, permit the magnet carrier to spring back into the position at rest, and in that the position of the magnet in the position of rest and its strength are matched to the position of the magnetic switch in such a manner, that the magnetic switch, having been closed once, remains in the closed state even if the magnet is in the position at rest.

* * * * *